United States Patent
Kobori et al.

[19]

[11] Patent Number: 6,121,526
[45] Date of Patent: Sep. 19, 2000

[54] ROTARY DAMPER

[75] Inventors: Takeaki Kobori; Hirozumi Sasa, both of Tokyo, Japan

[73] Assignee: Tok Bearing Co., Ltd., Tokyo, Japan

[21] Appl. No.: 09/427,831

[22] Filed: Oct. 26, 1999

[30] Foreign Application Priority Data

Oct. 26, 1998 [JP] Japan .................................. 10-321516
Aug. 11, 1999 [JP] Japan .................................. 11-228044

[51] Int. Cl.$^7$ ...................................................... G10C 3/02
[52] U.S. Cl. ................................. 84/179; 84/178; 84/177
[58] Field of Search .............................. 84/179, 177, 178

[56] References Cited

U.S. PATENT DOCUMENTS 5,635,655  6/1997  Yamashita .................................. 84/179

FOREIGN PATENT DOCUMENTS 5-10366  1/1993  Japan .

*Primary Examiner*—Paul Ip
*Assistant Examiner*—Shih-yung Hsieh
*Attorney, Agent, or Firm*—Merchant & Gould P.C.

[57] ABSTRACT

A rotary damper has a shaft and a torque control mechanism which are accommodated in a chamber filled with a viscous fluid. The chamber is divided into a first compartment and a second compartment. The torque control mechanism comprises an auxiliary chamber defined by a partition wall disposed adjacent to the chamber in communication therewith, first and second communication holes defined in the partition wall and providing fluid communication between the first and second compartments and the auxiliary chamber, and a check valve for preventing the viscous fluid from flowing in the first communication hole from the auxiliary chamber toward the first compartment.

20 Claims, 14 Drawing Sheets

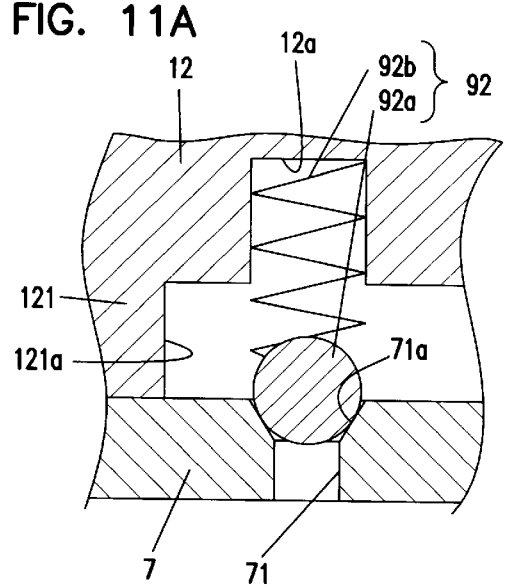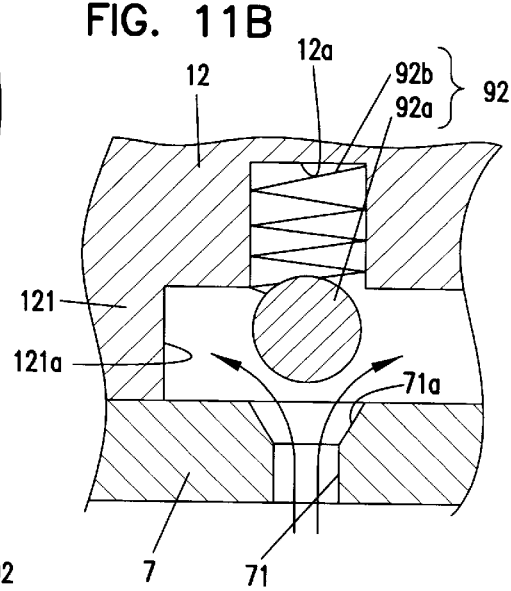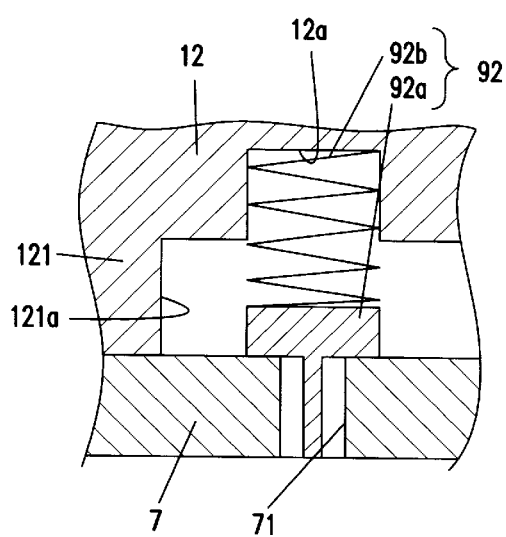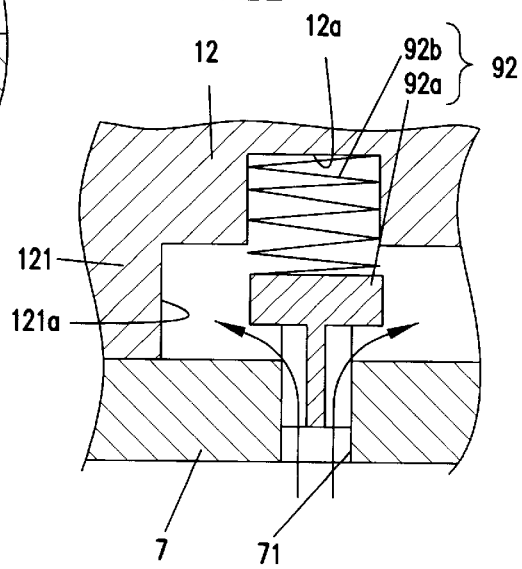

ROTARY DAMPER

BACKGROUND OF THE INVENTION

Field of the Invention

The present invention relates to a rotary damper for applying damping forces to the keyboard cover of a piano, for example, as it is opened and closed, and more particularly to a rotary damper free of backlash. Description of the Related Art:

One conventional rotary damper has a structure disclosed in Japanese laid-open patent publication No. 5-10366 as shown in FIG. 18 of the accompanying drawings. As shown in FIG. 18, when a movable shaft 2 rotates about its own axis in the direction indicated by the arrow a, a planar surface 9c of a valve 9a turns counterclockwise about a bearing recess 8a under the counterclockwise pressure from working oil 10 in a chamber A, bringing an arcuate surface 9d of the valve 9a into intimate contact with an inner wall surface 1k of a cylinder 1, so that the valve 9a is closed thereby to produce a high torque. When the movable shaft 2 rotates about its own axis in the direction indicated by the arrow b, the arcuate surface 9d of the valve 9a is subject to clockwise forces from the working oil 10 and turns clockwise about the bearing recess 8a. The arcuate surface 9d is spaced from the inner wall surface 1k, so that the valve 9a is opened thereby to produce a low torque.

When the movable shaft 2 is temporarily stopped while it is being rotated in the direction to open the valve 9a, and is then turned in the direction to close the valve 9a, it takes a certain period of time for the valve 9a spaced from the inner wall surface 1k to turn into intimate contact with the inner wall surface 1k again under the pressure of the working oil 10. Until the valve 9a is brought into intimate contact with the inner wall surface 1k, the rotary damper is unable to produce a high torque.

The idle period of time or interval during which the transition to a high torque is not available from the rotary damper is referred to as backlash. Because of the backlash, the conventional rotary damper fails to provide a quick damping effect which would be needed when damping forces are required to dampen a closing cover, for example. There has been a demand for a rotary damper which has a quick response to provide the transition to a high torque.

SUMMARY OF THE INVENTION

According to the present invention, there is provided a rotary damper comprising a tubular casing having a chamber defined therein, a viscous fluid filled in the chamber, a shaft having a portion accommodated in the chamber and having a support shaft portion connectable to an external member, the shaft being rotatable with respect to the tubular casing, a first ridge extending axially along and projecting radially outwardly from an outer circumferential surface of the portion of the shaft which is accommodated in the chamber, the first ridge having a radially outer end face disposed for sliding contact with an inner circumferential surface of the tubular casing, a second ridge extending axially along and projecting radially inwardly from the inner circumferential surface of the tubular casing, the second ridge having a radially inner end face held in sliding contact with the radially outer circumferential surface of the portion of the shaft which is accommodated in the chamber, the first ridge and the second ridge cooperating with each other in limiting the shaft and the tubular casing to relative rotation within a predetermined range, and dividing an interior of the chamber into a first compartment and a second compartment, the volume of said first and second compartments being variable complementarily to each other in response to said relative rotation of said shaft and said casing, and torque control means for generating a higher torque or a lower torque depending on the direction in which the shaft rotates with respect to the tubular casing, by controlling a flow of the viscous fluid between the first compartment and the second compartment when shaft rotates with respect to the tubular casing, the torque control means comprising an auxiliary chamber defined in the tubular casing by a partition wall adjacent to the chamber in communication with the chamber, first and second communication holes defined in the partition wall and providing fluid communication between the first and second compartments and the auxiliary chamber, and a check valve for preventing the viscous fluid from flowing in the first communication hole from the auxiliary chamber toward the first compartment.

When the shaft rotates in one direction, a path is provided for the viscous fluid to flow from the chamber via the auxiliary chamber back into the chamber. Since the resistant to the flow of the viscous fluid is small, the rotary damper produces a low torque.

When the shaft rotates in the opposite direction, the check valve prevents the viscous fluid from flowing in the first communication hole from the auxiliary chamber into the first compartment of the chamber. Therefore, no path is provided for the viscous fluid to flow from the chamber via the auxiliary chamber back into the chamber. The viscous fluid flows only through a small radial gap between the inner circumferential surface of the tubular casing and the first ridge, a small radial gap between the second ridge and the outer circumferential surface of the shaft, and a small thrust gap between the end face of the first ridge and the side surface of the partition wall. Consequently, the viscous fluid is subjected to large resistance, and the rotary damper generates a high torque.

Since the check valve can quickly be opened and closed, when the shaft rotates in the opposite direction, the viscous fluid is completely prevented from flowing from the auxiliary chamber into the chamber immediately after the shaft starts to rotate. Consequently, the rotary damper generates a high torque at the same time the shaft starts to rotate. When the shaft rotates in said one direction, the viscous fluid quickly flows from the chamber to the auxiliary chamber immediately after the shaft starts to rotate. Therefore, the rotary damper generates a low torque at the same time the shaft starts to rotate.

The chamber and the auxiliary chamber are juxtaposed axially of the shaft with the partition wall interposed therebetween. Therefore, the rotary damper may have a relatively small diameter. As a result, the rotary damper may effectively be used in a narrow space in the radial direction where it has to be installed and connected to an external device.

The auxiliary chamber is positioned radially outwardly of the chamber. Thus, the rotary damper may have a relatively small axial length as a whole. As a result, the rotary damper may effectively be used in a small in the axial direction where it has to be installed and connected to an external device.

The check valve comprises a reed valve for covering an open end of the first communication hole which is open into the auxiliary chamber. The check valve may alternatively comprise a ball valve or a tappet valve. These valves operate under recovering forces under spring biasing forces, and hence can reliably open and close the first communication hole for controlling the flow of the viscous fluid. Even when a cover or the like to which the rotary damper is installed is temporarily stopped in its opening or closing movement and then opened or stopped again, the rotary damper is capable of producing a high torque or a low torque at the same time that the shaft rotates again.

The reed valve comprises a proximal portion engaging the partition wall, an arm extending from the proximal portion along the inner circumferential surface of the tubular casing, and a valve body portion on an end of the arm for covering the open end. Since the valve body portion on the end of the arm has increased restoring forces, the open end can reliably be closed by the movable valve body. The reed valve can be prevented from moving in the circumferential direction, e.g., from rotating.

The partition wall has an engaging boss formed on a surface thereof which confronts the reed valve, said reed valve further comprising a hole defined in the proximal portion and engaged with said engaging boss, whereby said reed valve is held in engagement with the partition wall. Thus, the proximal portion is allowed to be easily held in engagement with the partition wall.

The reed valve further comprises a central ring portion integrally extending from the proximal portions and having a through hole through which the shaft extends. Inasmuch as the reed valve is supported at its central ring portion by the shaft, the reed valve can be prevented more effectively from moving in the circumferential direction, and hence the open end of the first communication hole and the valve body portion of the reed valve are prevented from being positionally shifted relatively to each other. Therefore, the open end can reliably be closed by the valve body portion.

The partition wall has an annular land on a radially inner portion thereof and a circular seat disposed around the open end of the first communication hole on a surface thereof which confronts the auxiliary chamber, the central ring portion of the reed valve resting on the annular land, and a circular seat having substantially the same height as the annular land, the valve body portion being placed on the circular seat to cover the open end.

The above circular seat is effective in closing the open end of the first communication hole more reliably. With the reed valve being partly spaced from the surface of the partition wall which is exposed to the auxiliary chamber, any resistance to the opening and closing of the open end is reduced, and the open end can be opened and closed with an increased response.

The circular seat is cylindrical. The cylindrical circular seat improves intimate contact between a lower surface of the reed valve and an upper surface of the circular seat for thereby allowing the open end to be closed more reliably.

The partition wall has an annular land on a radially inner portion thereof on a surface thereof which confronts the auxiliary chamber, the central ring portion of the reed valve resting on the annular land, and the valve body portion having a thickness which is substantially the same as the height of the annular land, the valve body portion covering the open end.

The increased thickness of the valve body portion offers the same advantages as those presented by the circular seat. Specifically, the open end of the first communication hole can be closed more reliably, any resistance to the opening and closing of the open end is reduced, and the open end can be opened and closed with an increased response.

The inner circumferential surface of the tubular casing has an annular stepped surface, the partition wall having a portion placed on the annular stepped surface. The annular stepped surface provides an increased sealing effect on the viscous fluid, and does not require strict dimensional accuracy for the inside diameter of the tubular casing and the outside diameter of the partition wall. Thus, the rotary damper can easily be manufactured.

The first ridge further includes a cap mounted thereon for adjusting a gap between the first ridge and the inner circumferential surface of the tubular casing. When the shaft rotates, the cap has its outer end face held in sliding contact with the inner circumferential surface of the tubular casing, and rotates in unison with the first ridge.

The cap provides increased intimate contact between the inner circumferential surface of the tubular casing and the first ridge. Therefore, the rotary damper can produce a higher torque. The increased intimate contact between the inner circumferential surface of the tubular casing and the first ridge is effective to increase the response of the check valve, with the result that the tubular casing does not need to be strictly circular in shape.

In the absence of the cap, when the outer end face of the first ridge is worn or otherwise damaged, the first ridge would need to be replaced in its entirety. However, with the cap used, only the cap needs to be replaced when its outer end face is worn or otherwise damaged. The cap can easily be replaced, and its cost is relatively small. If the cap were not used, it would be necessary to take sufficient care in the accuracy with which to machine the tubular casing and the shaft.

The second ridge further includes a cap mounted thereon for adjusting a gap between the second ridge and the outer circumferential surface of the shaft. When the shaft rotates, the cap has its inner end face held in sliding contact with the outer circumferential surface of the shaft. The cap provides increased intimate contact between the outer circumferential surface of the shaft and the second ridge. Therefore, the rotary damper can produce a higher torque. The increased intimate contact between the outer circumferential surface of the shaft and the second ridge is effective to increase the response of the check valve.

In the absence of the above cap, when the inner end face of the second ridge is worn or otherwise damaged, the second ridge would need to be replaced in its entirety. However, with the cap used, only the cap needs to be replaced when its outer end face is worn or otherwise damaged. The cap can easily be replaced, and its cost is relatively small. If the cap were not used, it would be necessary to take sufficient care in the accuracy with which to machine the tubular casing and the shaft.

The portion of the shaft which is accommodated in the chamber has a groove defined in the radially outer circumferential surface thereof and extending in a circumferential direction thereof. The groove has a constant depth and a progressively varying axial width, or alternatively, a constant axial width and a depth varying in the circumferential direction. When the groove moves across the second ridge, a clearance depending on the width and the depth of the groove is formed between the shaft and the second ridge. The viscous fluid flows through the clearance between the first compartment in one of the chambers and the second compartment in the other chamber, so that the torque generated by the rotary damper can be reduced or adjusted.

The rotary damper comprises a plurality of second ridges extending axially along the inner circumferential surface of the tubular casing and spaced at equal intervals thereby to define a plurality of chambers in the tubular casing, and a plurality of first ridges extending axially along the radially outer circumferential surface of the portion of the shaft which is accommodated in the chambers, each of the first ridges being positioned in one of the chambers. With this arrangement, the angular range in which the shaft is angularly movable can be limited so as to match the angular range in which a cover or the like on which the rotary damper is installed can be opened and closed, and the magnitude of the torque generated by the rotary damper can be adjusted.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIGS. 11A and 11B are cross-sectional views showing a modification of the check valve in the rotary damper according to the first embodiment;

FIGS. 12A and 12B are cross-sectional views showing a modification of the check valve in the rotary damper according to the first embodiment;

DETAILED DESCRIPTION OF THE PREFERRED EMBODIMENTS

Figure 1:
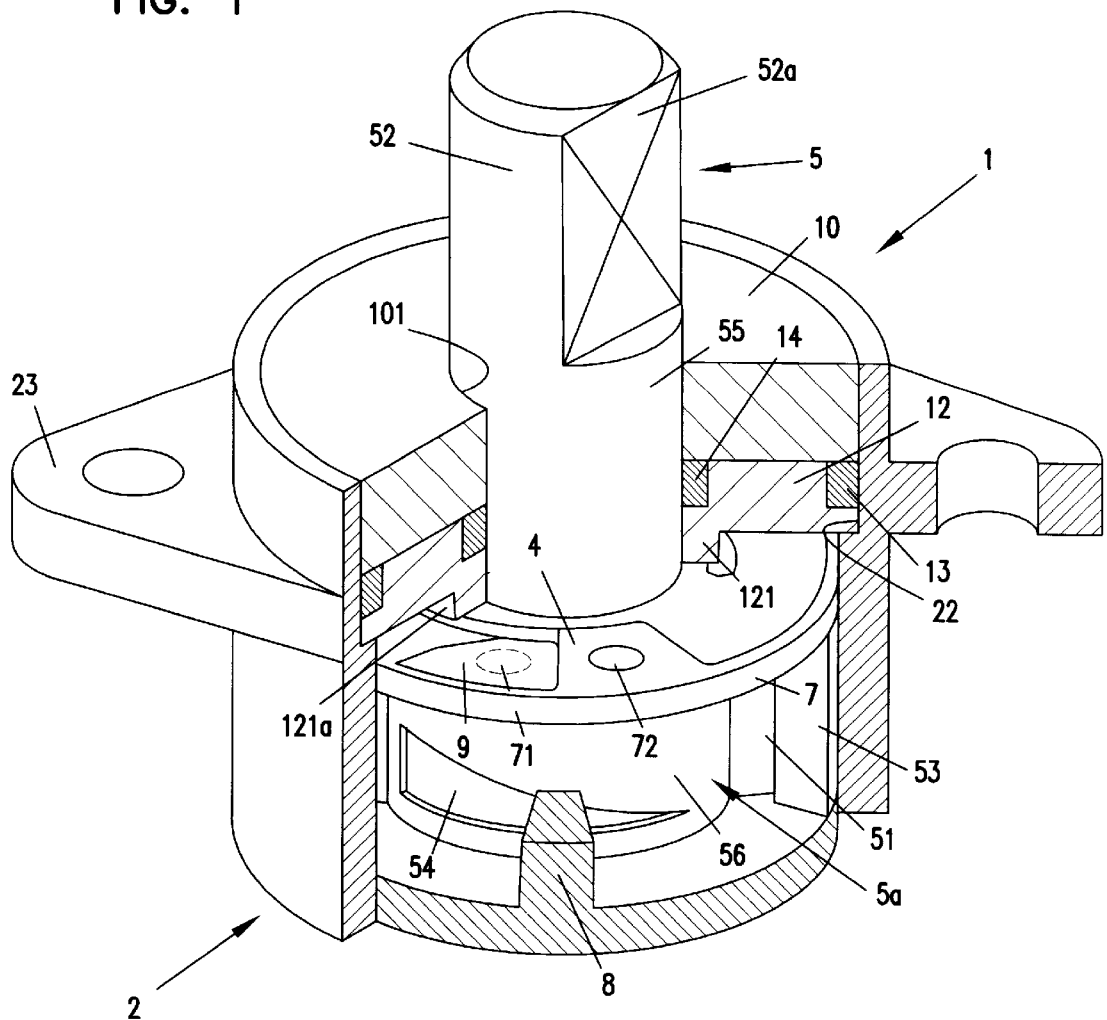
FIG. 1 is a perspective view, partly cut away, of a rotary damper according to a first embodiment of the present invention.
Figure 2:
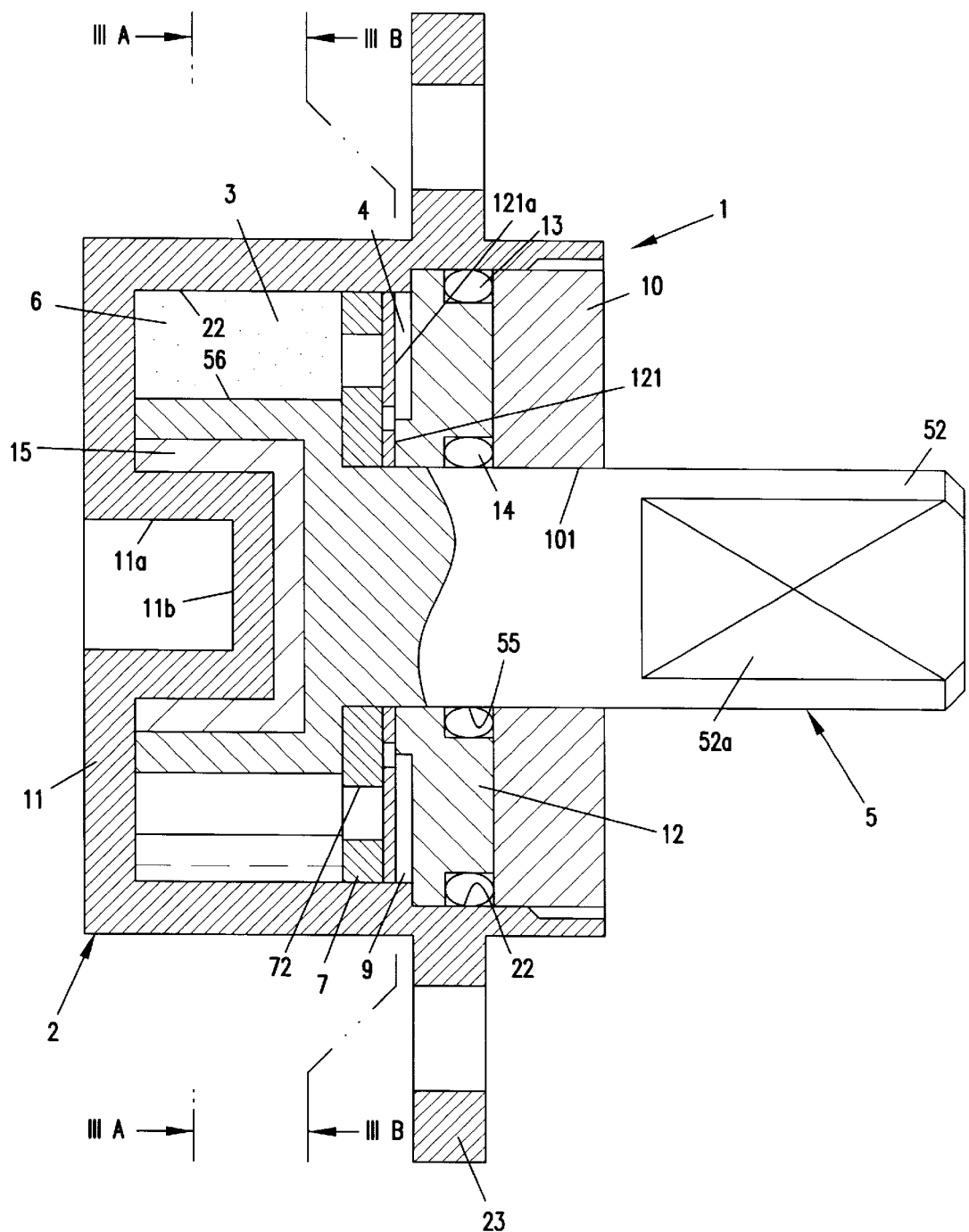
FIG. 2 is a longitudinal cross-sectional view showing an internal structure of the rotary damper according to the first embodiment.

As shown in FIGS. 1 and 2, a rotary damper according to a first embodiment of the present invention comprises a tubular casing 2 having a chamber 3 and an auxiliary chamber 4 defined therein, a shaft 5 partly disposed in the chamber 3, and a viscous fluid 6 such as silicone oil or the like filled in the chamber 3 and the auxiliary chamber 4.

The tubular casing 2 has an end sealed by a bottom wall 11 having a recess 11a defined in an outer surface thereof by a boss 11b projecting axially into the chamber 3. The tubular casing 2 has an opposite open end closed by an apertured cap 10. The shaft 5 has a portion 5a disposed in the chamber 3 and rotatably supported on the boss 11b by a bushing 15. The apertured cap 10 has a central aperture 101 through which a support shaft portion 52 of the shaft 5 projects out of the tubular casing 2. The support shaft portion 52 has a retainer surface 52a which engages an external member such as a cover to be dampened by the rotary damper.

The bottom wall 11 of the tubular casing 2 may have a recess defined in an inner surface thereof, rather than the recess 11a defined in the outer surface thereof, and the portion 5a of the shaft 5 may be rotatably supported in the recess defined in the inner surface of the bottom wall 11.

A plate 12 is held against an inner surface of the apertured cap 10. The plate 12 has a land 121 disposed on a surface thereof facing away from the apertured cap 10 and projecting axially in surrounding relation to the support shaft portion 52 of the shaft 5. A first sealing member 13 such as an O-ring is disposed between the plate 12 and an inner circumferential surface 22 of the tubular casing 2. A second sealing member 14 such as an O-ring is disposed between the plate 12 and an outer circumferential surface 55 of the support shaft portion 52. The first and second sealing members 13, 14 prevent the viscous fluid 6 from leaking out of the tubular casing 2.

As shown in FIGS. 3A, 3B through 6A, 6B, two first ridges 51 extend axially along and project radially outwardly from an outer circumferential surface 56 of the portion 5a of the shaft 5, the first ridges 51 being symmetrical and diametrically opposite to each other across the center O of the shaft 5. The first ridges 51 have radially outer ends capped by caps 53 each of a substantially C-shaped cross section having two hanging walls 53a, 53b disposed one on each side of the first ridge 51. When the shaft 5 rotates about its own axis, the caps 53 rotate in unison with the first ridges 51 without any substantial circumferential and radial play between the caps 53 and the first ridges 51.

The caps 53 have respective radially outer end surfaces 53c held in intimate sliding contact with the inner circumferential surface 22 of the tubular casing 2 without any appreciable clearance between the radially outer end surfaces 53c and the inner circumferential surface 22. Therefore, the chamber 3 is highly sealed by the caps 53 and the first ridges 51 for thereby enabling the rotary damper to generate a high torque.

The expression "without any substantial circumferential and radial play between the caps 53 and the first ridges 51" referred to above means that the caps 53 do not wobble on the first ridges 51, and does not signify that the caps 53 and the first ridges 51 should have dimensional accuracy required by precision parts.

Figure 3B:
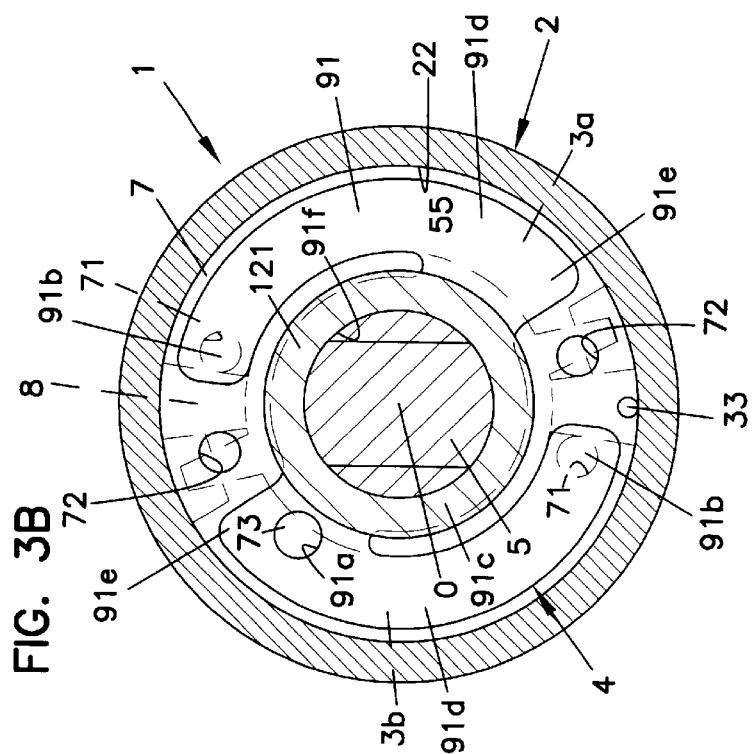
FIG. 3B is a cross-sectional view taken along line IIIB—IIIB of FIG. 2, illustrative of operation of the rotary damper according to the first embodiment.
Figure 3A:
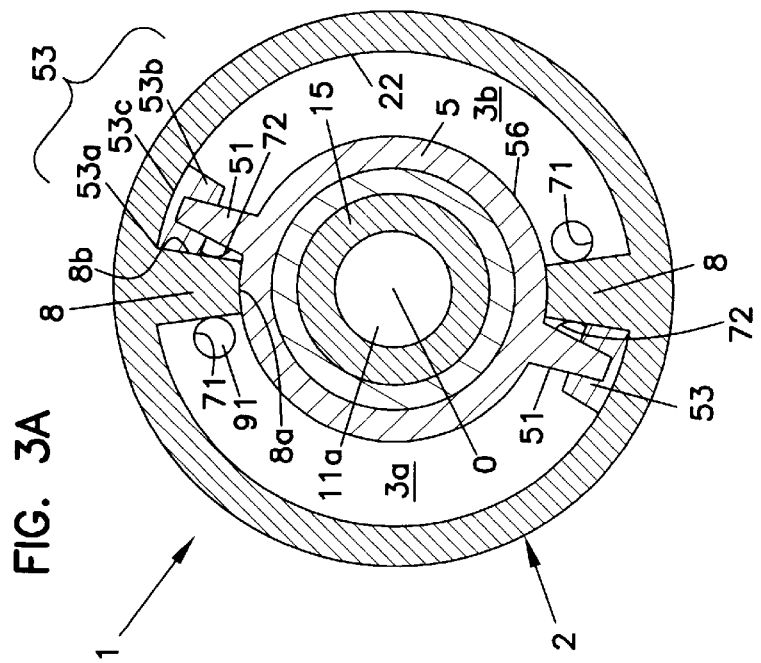
FIG. 3A is a cross-sectional view taken along line IIIA—IIIA of FIG. 2, illustrative of operation of the rotary damper according to the first embodiment.
Figure 5B:
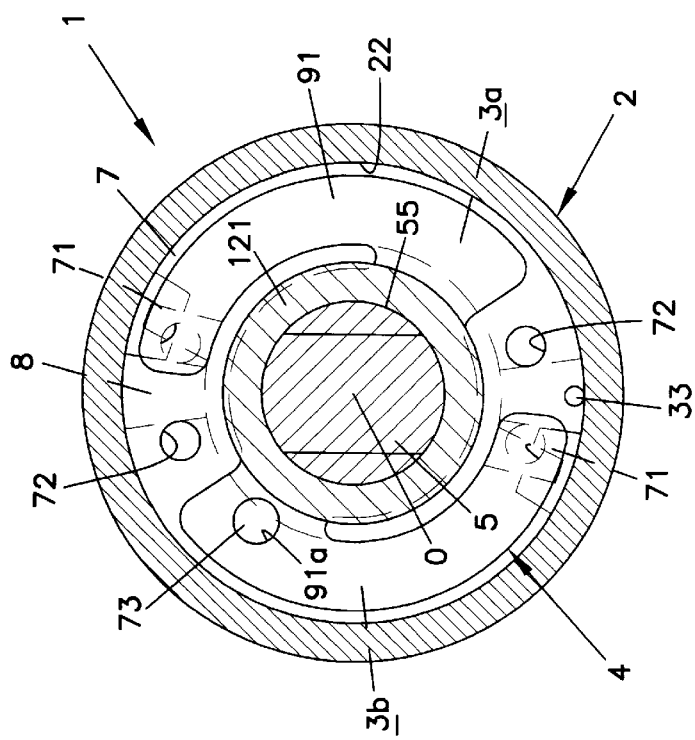
FIG. 5B is a cross-sectional view similar to FIG. 3B, illustrative of operation of the rotary damper according to the first embodiment.
Figure 5A:
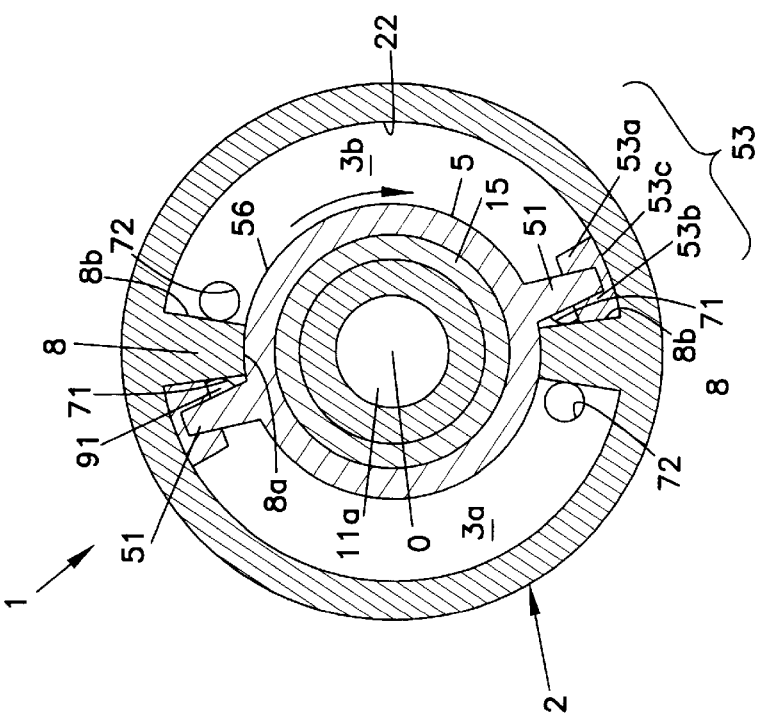
FIG. 5A is a cross-sectional view similar to FIG. 3A, illustrative of operation of the rotary damper according to the first embodiment.

Two second ridges 8 extend axially and project radially inwardly from the inner circumferential surface 22 of the tubular casing 2, the second ridges 8 being symmetrical and diametrically opposite to each other across the center O of the shaft 5. The shaft 5 is rotatable with its outer circumferential surface 56 held in sliding contact with radially inner end surfaces 8a of the second ridges 8. When side faces of the hanging walls 53a or 53b of the caps 53 abut against side faces 8b of the second ridges 8, the shaft 5 is prevented from rotating about its own axis. Thus, the shaft 5 is rotatable in a predetermined angular range limited by the first and second ridges 51, 8. FIGS. 3A and 3B show the position of the parts of the rotary damper when the side faces of the hanging walls 53a of the caps 53 abut against corresponding side faces 8b of the second ridges 8, and FIGS. 5A and 5B show the position of the parts of the rotary damper when the side faces of the hanging walls 53b of the caps 53 abut against corresponding side faces 8b of the second ridges 8.

The second ridges 8 divide the chamber 3 into two chambers 3a, 3b around the shaft 5. The first ridges 51 of the shaft 5 are disposed in the respective chambers 3a, 3b so as to be circumferentially movable between two second ridges 8. Each of the chambers 3a, 3b is divided by one of the first ridges 51 into a first compartment 31 and a second compartment 32 whose volumes are variable complementarily to each other in response to the movement of the first ridges 51.

The chamber 3 and the auxiliary chamber 4 in the tubular casing 2 are divided from each other by a partition wall 7 extending parallel to the plate 12 and having an outer circumferential end fixed to the inner circumferential surface 22 of the tubular casing 2. The auxiliary chamber 4 is positioned on one side of the chamber 3 remote from the bottom wall 11 and disposed more closely to the support shaft portion 52 of the shaft 5 than the chamber 3 is.

As shown in FIGS. 1, 3A, 3B through 6A, 6B, the partition wall 7 is fixed to the inner circumferential surface 22 of the tubular casing 2 by a retaining projection 33 on an end of one of the second ridges 8 which faces the open end of the tubular casing 2. Alternatively, the partition wall 7 may be fixed to the inner circumferential surface 22 of the tubular casing 2 by an outer circumferential edge of the partition wall 7 fitted in an engaging groove (not shown) defined in the inner circumferential surface 22 of the tubular casing 2. Alternatively, the partition wall 7 may be integrally formed with the inner circumferential surface 22 of the tubular casing 2. Further alternatively, a first tubular casing with the chamber 3 defined therein and a second tubular casing with the auxiliary chamber 4 defined therein may be prepared, and joined to each other and divided from each other by a common partition wall.

As shown in FIGS. 1 and 2, the auxiliary chamber 4 extends axially between the partition wall 7 and the plate 11, and extends radially between an outer circumferential surface 121a of the land 121 and the inner circumferential surface 22 of the tubular casing 2. The distance between the partition wall 7 and the plate 12 is sufficiently smaller than the distance between the partition wall 7 and the bottom wall 11, so that the volume of the auxiliary chamber 4 is sufficiently smaller than the volume of the chamber 3.

As shown in FIGS. 3A, 3B through 6A, 6B, the partition wall 7 has two pairs of first and second communication holes 71, 72 defined transversely therethrough. The first communication holes 71 are disposed respectively in the chambers 3a, 3b, and the second communication holes 72 are disposed respectively in the chambers 3a, 3b. The first and second communication holes 71, 72 of each pair are positioned one on each side of one of the second ridges 8 in the circumferential direction. The first communication holes 71 are positioned symmetrically with respect to the center O of the shaft 5, i.e., diametrically opposite to each other across the center O of the shaft 5, and the second communication holes 72 are also positioned symmetrically with respect to the center O of the shaft 5, i.e., diametrically opposite to each other across the center O of the shaft 5.

As shown in FIGS. 3B, 4B, 5B, and 6B, a reed valve 91 acting as a check valve 9 is placed on and fixed to the surface of the partition wall 7 which is exposed to the auxiliary chamber 4. A substantial area of the surface of the partition wall 7 is covered with the reed valve 91. The reed valve 91 is prevented from rotating, i.e., moving circumferentially of the tubular casing 2, by an engaging boss 73 of the partition wall 7 which engages in a hole 91a defined in a proximal portion 91e of the reed valve 91. The reed valve 91 may alternatively be prevented from rotating by locally bonding the reed valve 91 and the partition wall 7 at suitable spots without inhibiting the reed valve 91 from opening and closing the first communication holes 71.

As shown in FIG. 3B, the reed valve 91 comprises two proximal portions 91e positioned in diametrically opposite relation to each other across the center O of the shaft 5, two arms 91d integrally extending arcuately from the respective proximal portions 91e symmetrically along the inner circumferential surface 22 of the tubular casing 2, and a central ring portion 91c integrally extending from the proximal portions 91e and having a through hole 91f through which the shaft 5 extends. The arms 91d have respective ends serving as movable valve bodies 91b covering the open ends of the first communication holes 71 which are open into the auxiliary chamber 4.

In the illustrated embodiment, arcuate slits are defined between the central ring portion 91c and the arms 91d, providing large restoring forces when the valve body portions 91b return to their original position after having been lifted by the viscous fluid. The reed valve 91 of the illustrated shape may be replaced with a substantially circular reed valve free of slits if the reed valve is thinner or made of a material capable of generating greater restoring forces.

The ends of the arms 91d should preferably be used as the valve body portions 91b for large restoring forces. However, any desired portions of the arms 91d may be used as the movable valve bodies 91b.

The two communication holes 71 are covered with the respective valve body portions 91b of the reed valve 91, whereas the two communication holes 72 are not covered with the reed valve 91. The reed valve 91, which may comprise a shaped leaf spring, is placed on the partition wall 7 in covering relation to the open ends of the first communication holes 71 which are open into the auxiliary chamber 4. As described above, the valve body-portions 91b return to their original position under restoring forces from the arms 91d after having been lifted by the viscous fluid.

Figure 7:
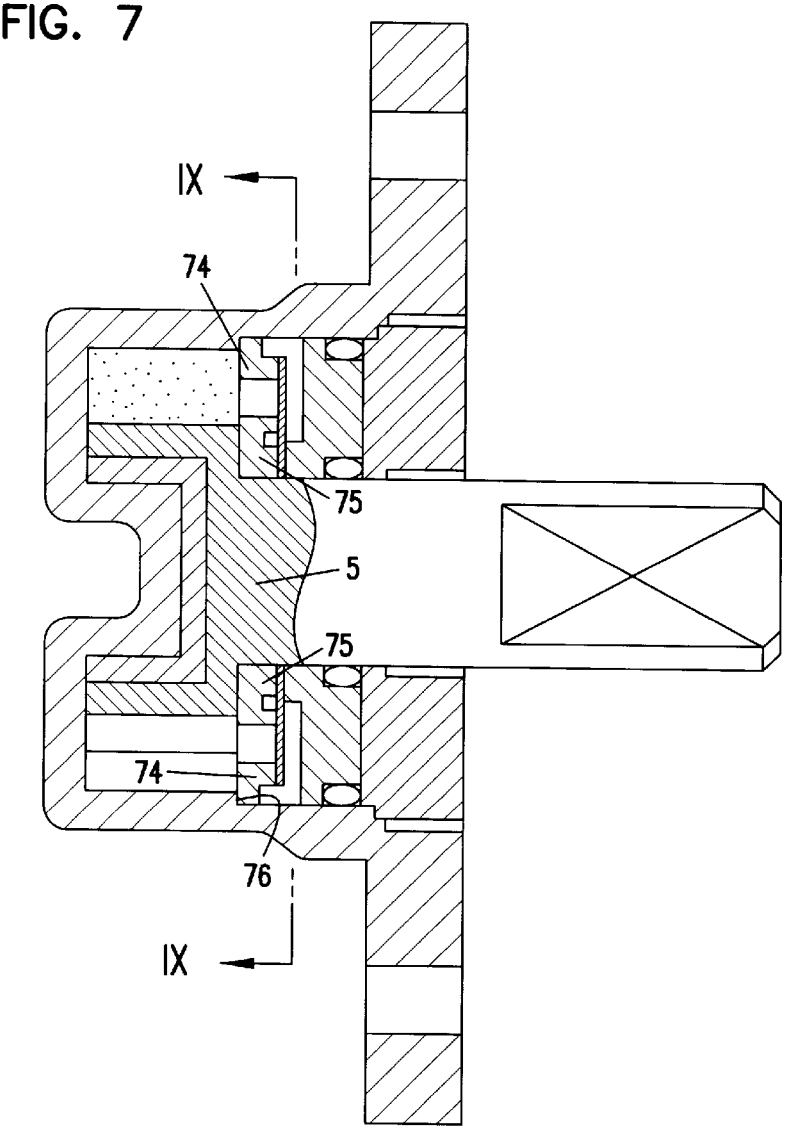
FIG. 7 is a longitudinal cross-sectional view showing an internal structure of a rotary damper which employs a modification of a check valve in the rotary damper according to the first embodiment.
Figure 8:
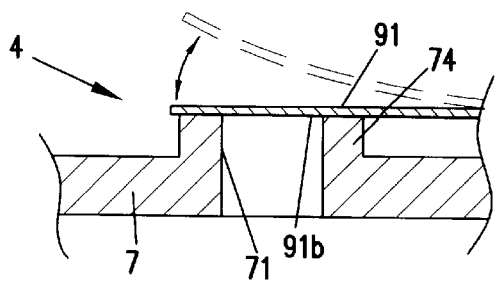
FIG. 8 is a partially enlarged view of FIG. 7, illustrative of movement of the modified check valve.

As shown in FIGS. 1 and 2, one entire surface of the reed valve 91 is placed on the surface of the partition wall 7 which is exposed to the auxiliary chamber 4. However, a modified partition wall as shown in FIGS. 7 and 8 may be employed. As shown in FIG. 7, two circular seats 74 projecting from the surface of the partition wall 7 are disposed around the respective open ends of the first communication holes 71 which are exposed to the auxiliary chamber 4. The partition wall 7 has an annular land 75 on a radially inner portion thereof which has the same height as the circular seats 74.

The central annular portion 91c of the reed valve 91 is placed on the annular land 75, and the valve body portions 91b are positioned on the respective circular seats 74 in covering relation to the respective open ends of the first communication holes 71 which are exposed to the auxiliary chamber 4. While the seats 74 are preferably cylindrical in shape, they are not limited to such a cylindrical shape.

FIG. 8 shows one of the open ends of the first communication holes 71 which are exposed to the auxiliary chamber 4, and one of the valve body portions 91b of the reed valve 91 which is normally placed on the corresponding circular seat 74 to close the open end of the first communication hole 71.

Since the reed valve 91 can be brought into intimate contact with outer end faces of the circular seats 74, the reed valve 91 can reliably close off the open ends of the first communication holes 71 which are exposed to the auxiliary chamber 4. Furthermore, because the reed valve 91 and the surface of the partition wall which is exposed to the auxiliary chamber 4 are spaced from each other, the first communication holes 71 can be opened and closed with an increased response as the resistance to the reed valve 91 in opening and closing the first communication holes 71 is reduced.

Figure 9:
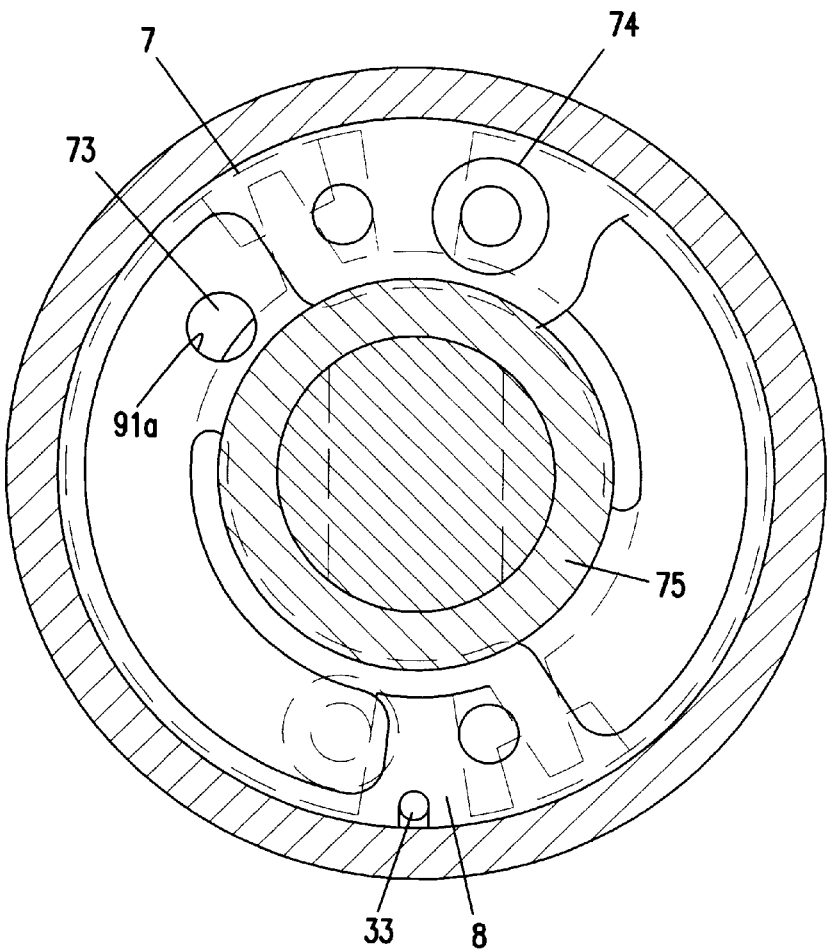
FIG. 9 is a cross-sectional view taken along line IX—IX of FIG. 7.

As shown in FIG. 9, the reed valve 91 shown in FIGS. 7 and 8 is fixed to the partition wall 7 by the engaging boss 73 of the partition wall 7 which engages in the hole 91a defined in the proximal portion 91e of the reed valve 91. However, the reed valve 91 may be fixed to the partition wall 7 by any of various other means.

Figure 10:
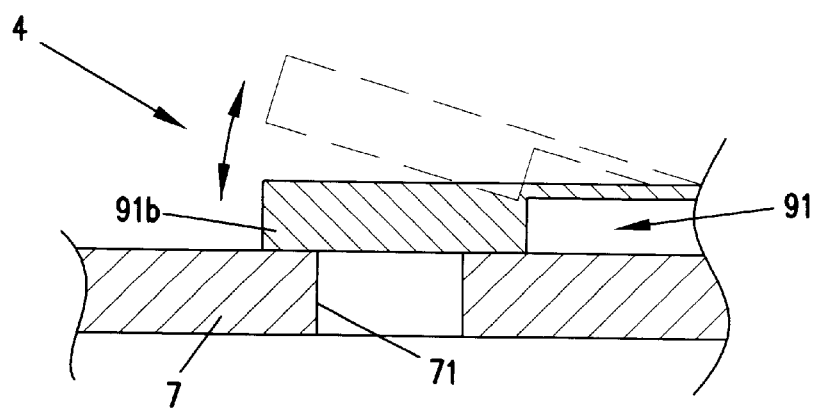
FIG. 10 is a cross-sectional view showing another modification of the check valve in the rotary damper according to the first embodiment.

FIG. 10 shows another modification of the check valve in the rotary damper according to the first embodiment. In FIG. 10, the reed valve 91 has a radially outer valve body portion 91b having an increased thickness. The open end of the first communication hole 71 which is open into the auxiliary chamber 4 is normally covered by the valve body portion 91b. While only one valve body portion 91b is shown in FIG. 10, the respective ends of the two arms 91d of the reed valve 91 have respective movable valve bodies 91b. Although not shown, the partition wall 7 has an annular land on a radially inner portion thereof which has the same height as the valve body portions 91b of the reed valve 91.

The reed valve 91 shown in FIG. 10 is capable of closely covering the open ends of the first communication hole 71 which are open into the auxiliary chamber 4, the reed valve 91 can reliably close off the open ends of the first communication holes 71 with an increased response.

In the above two modifications, the partition wall 7 is fixed to the inner circumferential surface 22 of the tubular casing 2 by a retaining projection 33 on an end of one of the second ridges 8 which faces the open end of the tubular casing 2, as shown in FIG. 9. However, these modifications differ from the first embodiment as follows: In the first embodiment, as shown in FIG. 2, the partition wall 7 which has an outside diameter slightly smaller than the inside diameter of the tubular casing 2 is fitted and accommodated in the tubular casing 2. In the modifications, as shown in FIG. 7, the inner circumferential surface 22 of the tubular casing 2 has an annular step to define an annular stepped surface 76 on which there is placed a radially outer edge of the partition wall 7 that is accommodated in the tubular casing 2. The structure of the modifications provides an increased sealing capability at the annular stepped surface 76 and does not require strict dimensional accuracy with respect to the inside diameter of the tubular casing 2 and the outside diameter of the partition wall 7. The rotary damper according to the first embodiment may have the stepped surface with the partition wall placed thereon as shown in FIG. 7.

The rotary damper may employ a ball valve 92 shown in FIGS. 11A and 11B or a tappet valve 93 shown in FIGS. 12A and 12B, rather than the reed valve.

In the rotary damper with the ball valve 92 shown in FIGS. 11A and 11B, the first communication hole 71 has a tapered surface 71a on its outer open end opening into the auxiliary chamber 4, the tapered surface 71a spreading outwardly toward the outer open end of the first communication hole 71. The ball valve 92 comprises a ball 92a seated on the tapered surface 71a to close the first communication hole 71. The plate 12 has a recess 12a defined in a surface thereof which confronts the first communication hole 71, and a spring 92b such as a helical spring is placed in the recess 12a for normally urging the ball 92a in a direction to close the outer open end of the first communication hole 71.

In the rotary damper with the tappet valve 93 shown in FIGS. 12A and 12B, a tappet 93a placed in the first communication hole 71 has a lid whose diameter is greater than the inside diameter of the first communication hole 71. As with the rotary damper with the ball valve 92 shown in FIGS. 11A and 11B, the plate 12 has a recess 12a defined in a surface thereof which confronts the first communication hole 71, and a spring 93b such as a helical spring is placed in the recess 12a for normally urging the tappet 93a in a direction to close the outer open end of the first communication hole 71.

As shown in FIG. 1, the outer circumferential surface 56 of the portion 5a of the shaft 5 has a groove 54 defined therein in the circumferential direction, the groove 54 having a constant depth and a progressively varying axial width. The groove 54 may instead have a constant axial width and a depth varying in the circumferential direction, or an axial width and a depth which vary in the circumferential direction.

When the shaft 5 rotates about its own axis, if the groove 54 extends across the radially inner end face of the second ridge 8, the viscous fluid 6 flows from the first compartment 31 of one of the chambers 3a, 3b via the groove 54 into the second compartment 32 of the other chamber or from the second compartment 32 of one of the chambers 3a, 3b via the groove 54 into the first compartment 31 of the other chamber, so that the generated torque can be reduced or adjusted.

A groove having the same function as the groove 54 may be defined in an inner surface of the bottom wall 11 or a surface of the partition wall 7 which is exposed to the chamber 3. When an axial end surface of one of the first ridges 51 faces such a groove, the viscous fluid 6 flows from the first compartment 31 of one of the chambers 3a, 3b via the groove into the second compartment 32 thereof or from the second compartment 32 of one of the chambers 3a, 3b via the groove into the first compartment 31 thereof.

The rotary damper 1 is installed on a desired device as follows: The support shaft portion 52 of the shaft 5 is inserted into a hollow shaft (not shown) of a cover or the like to be dampened, to bring the retainer surface 52a into engagement with the hollow shaft. An apertured flange 23 projecting radially outwardly from the tubular casing 2 is nonrotatably fastened to a main body of the cover.

Operation of the rotary damper 1 will be described below with reference to FIGS. 3A, 3B through 6A, 6B. First, a mode of operation of the rotary damper 1 when the cover is opened from a fully closed state will be described below.

When the cover to which the rotary damper 1 is connected is fully closed, the parts of the rotary damper 1 are in the position shown in FIGS. 3A and 3B.

As shown in FIG. 3A, the side faces of the hanging walls 53a of the caps 53 on the first ridges 51 abut against one of the side faces 8b of the second ridges 8. In FIG. 3A, the first ridges 51 and the caps 53 close part of the open ends of the second communication holes 72 which are open into the chamber 3. Alternatively, the first ridges 51 and the caps 53 may be of such a shape as to fully close these open ends of the second communication holes 72. Further alternatively, these open ends of the second communication holes 72 may start opening at the same time the shaft 5 begins to rotate, and these open ends of the second communication holes 72 may be fully closed in the position of the parts shown in FIG. 3A insofar as the viscous fluid 6 flowing via the auxiliary chamber 4 can pass from the first communication holes 71, as described later on.

As shown in FIG. 3B, the open ends of the second communication holes 72 which are open into the auxiliary chamber 4 are fully covered and closed by the reed valve 91.

Figure 4B:
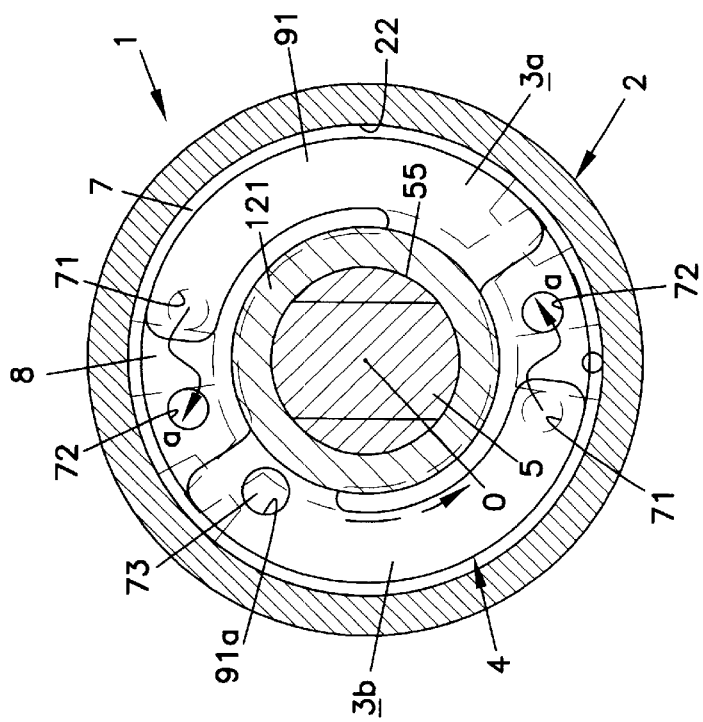
FIG. 4B is a cross-sectional view similar to FIG. 3B, illustrative of operation of the rotary damper according to the first embodiment.
Figure 4A:
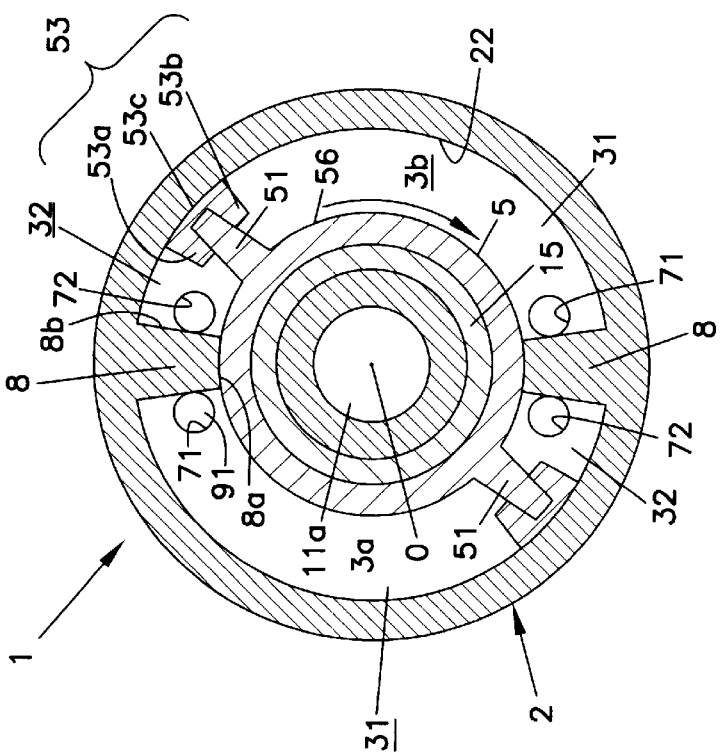
FIG. 4A is a cross-sectional view similar to FIG. 3A, illustrative of operation of the rotary damper according to the first embodiment.

FIGS. 4A and 4B show the position of the parts of the rotary damper 1 when the shaft 5 has slightly rotated clockwise from the angular position shown in FIGS. 3A and 3B.

As shown in FIG. 4A, the chambers 3a, 3b are respectively divided into the first compartments 31 and the second compartments 32 in the circumferential direction of the shaft 5 by the second ridges 8 and the first ridges 51. In each of the chambers 3a, 3b, the first compartment 31 is positioned ahead of the first ridge 51 and the second compartment 32 is positioned behind the first ridge with respect to the direction in which the shaft 5 rotates.

Since the internal pressure of the first compartments 31 increases upon rotation of the shaft 5, the viscous fluid 6 in the first compartments 31 acts to lift the portions of the reed valve 91 which cover the open ends of the first communication holes 71 which are open into the auxiliary chamber 4. When the lifting force of the viscous fluid 6 is greater than the restoring force of the reed valve 91, portions of the arms 91d of the reed valve 91 which include the valve body portions 91b covering the first communication holes 71 are spaced from the partition wall 7. As a result, the reed valve 91 is opened, allowing the first compartments 31 to communicate with the auxiliary chamber 4 via the first communication holes 71. As shown in FIG. 4B, the viscous fluid 6 flows from the first compartment 31 of one of the chambers 3a, 3b via the first communication hole 71 into the auxiliary chamber 4, and then flows via the second communication hole 72 disposed across the second ridge 8 from the first communication hole 71 and not covered by the reed valve 91 into the second compartment 32 of the other of the chambers 3a, 3b, as indicated by the arrows α.

If the ball valve 92 shown in FIGS. 11A and 11B is used in place of the reed valve 91, then the viscous fluid 6 in the first compartment 31 acts to lift the ball valve 92 which closes the open end of the first communication hole 71 which is open into the auxiliary chamber 4. When the lifting force of the viscous fluid 6 is greater than the spring force which biases the ball 92a, the ball 92a is lifted off the partition wall 7 toward the plate 12. As a result, the viscous fluid 6 which has flowed from the first compartment 31 of one of the chambers 3a, 3b via the first communication hole 71 into the auxiliary chamber 4 flows via the second communication hole 72 not covered by the ball 92a into the second compartment 32 of the other of the chambers 3a, 3b, as indicated by the arrows α.

If the tappet valve 93 shown in FIGS. 12A and 12B is used in place of the reed valve 91, then the viscous fluid 6 in the first compartment 31 acts to lift the tappet 93a which closes the open end of the first communication hole 71 which is open into the auxiliary chamber 4. When the lifting force of the viscous fluid 6 is greater than the spring force which biases the tappet 93a, the tappet 93a is lifted off the partition wall 7 toward the plate 12. As a result, the viscous fluid 6 which has flowed from the first compartment 31 of one of the chambers 3a, 3b via the first communication hole 71 into the auxiliary chamber 4 flows via the second communication hole 72 not covered by the tappet 93a into the second compartment 32 of the other of the chambers 3a, 3b, as indicated by the arrows α.

Since the path of the viscous fluid 6 is formed from the first compartment 31 of one of the chambers 3a, 3b via the first communication hole 71 to the auxiliary chamber 4 and then from the second communication hole 72 to the second compartment 32 of the other of the chambers 3a, 3b, the torque generated by the rotary damper 1 is small.

The auxiliary chamber 4, the pair of fluid communication holes, i.e., the first and second communication holes 71, 72, and the check valve 9 such as the reed valve 91 disposed on the first communication hole 71 jointly make up a torque control means for controlling the flow of the viscous fluid 6 between the first and second compartments 31, 32 upon rotation of the shaft 5.

When the shaft 5 rotates further from the angular position shown in FIGS. 4A and 4B, the side faces of the hanging walls 53b of the caps 53 abut against the other of the side faces 8b of the second ridges 8, thus stopping rotation of the shaft 5. In this position, the first ridges 51 and the caps 53 close part of the open ends of the first communication holes 71 which are open into the chamber 3. Alternatively, these open ends of the first communication holes 71 may fully be opened or closed. As described above, the torque generated by the rotary damper 1 can be reduced until the cover is fully opened from the closed state.

The check valve 9 can quickly be opened and closed as it is under the spring bias. Even immediately after the shaft 3 has rotated from the angular position shown in FIGS. 3A and 3B to the angular position shown in FIGS. 4A and 4B, the check valve 9 covering the first communication holes 71 are quickly opened without a time lag, allowing the viscous fluid 6 to flow quickly from the chamber 3 into the auxiliary chamber 4. As a consequence, the rotary damper 1 is capable of generating a low torque at the same time that the shaft 5 rotates, and is free of backlash.

Now, a mode of operation of the rotary damper 1 when the cover is closed from a fully open state will be described below.

When the cover to which the rotary damper 1 is connected is fully open, the parts of the rotary damper 1 are in the position shown in FIGS. 5A and 5B.

Figure 6B:
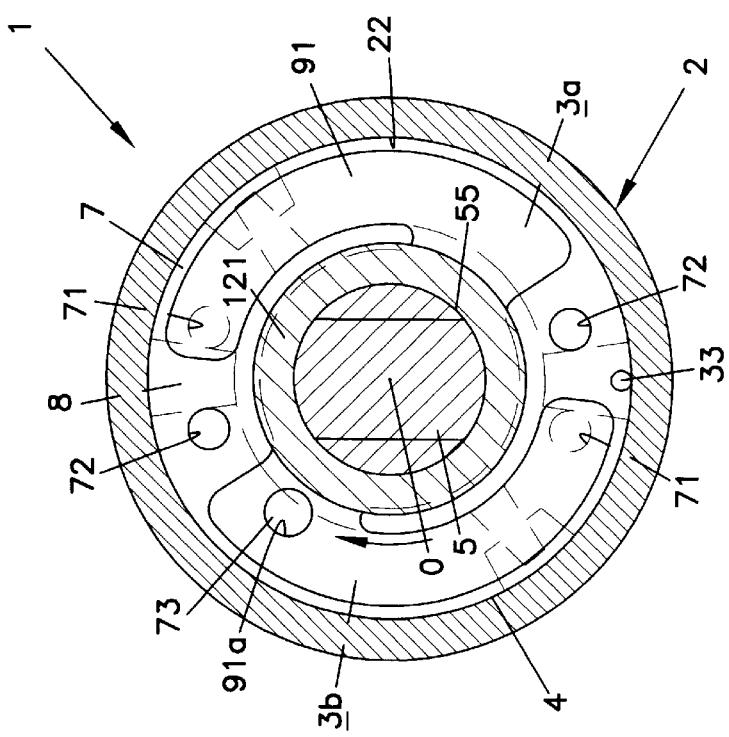
FIG. 6B is a cross-sectional view similar to FIG. 3B, illustrative of operation of the rotary damper according to the first embodiment.
Figure 6A:
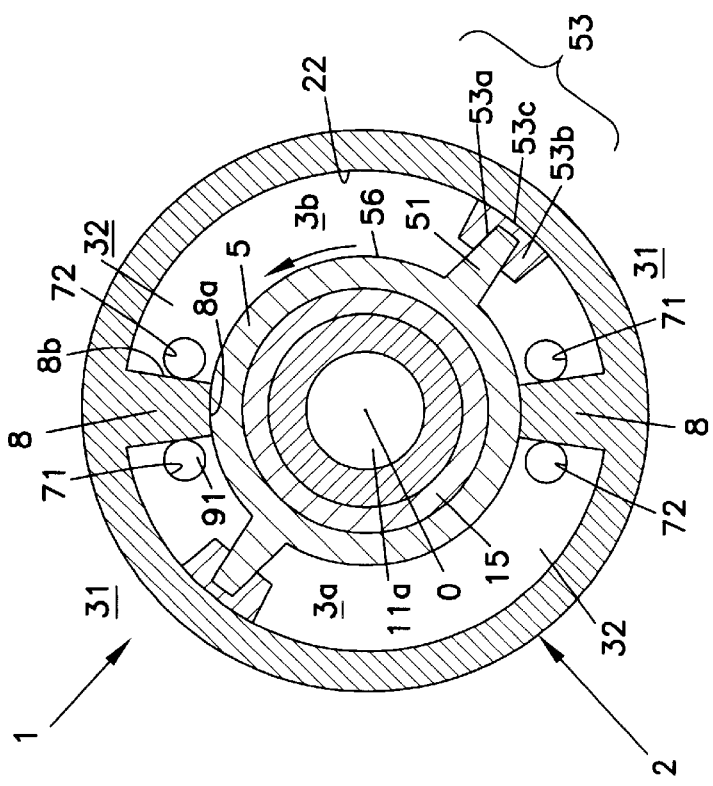
FIG. 6A is a cross-sectional view similar to FIG. 3A, illustrative of operation of the rotary damper according to the first embodiment.

FIGS. 6A and 6B show the position of the parts of the rotary damper 1 when the shaft 5 has slightly rotated counterclockwise from the angular position shown in FIGS. 5A and 5B.

As shown in FIG. 6A, the chambers 3a, 3b are respectively divided into the first compartments 31 and the second compartments 32 in the circumferential direction of the shaft 5 by the second ridges 8 and the first ridges 51. In each of the chambers 3a, 3b, the second compartment 32 is positioned ahead of the first ridge 51 and the first compartment 31 is positioned behind the first ridge with respect to the direction in which the shaft 5 rotates.

The internal pressure of the second compartments 32 increases upon rotation of the shaft 5. The increased fluid pressure is transmitted via the second communication holes 72 not covered by the reed valve 91 into the auxiliary chamber 4. The open ends of the first communication holes 71 which are open into the auxiliary chamber 4 are covered by the movable valve bodies 91b of the reed valve 91 which has restoring forces acting from the auxiliary chamber 4 toward the chamber 3. Because the transmitted fluid pressure further biases the reed valve 91 in the direction from the auxiliary chamber 4 toward the chamber 3, the open ends of the first communication holes 71 which are open into the auxiliary chamber 4 remain more firmly closed by the reed valve 91.

If the ball valve 92 shown in FIGS. 11A and 111B or the tappet valve 93 shown in FIGS. 12A and 12B is used in place of the reed valve 91, then the open ends of the first communication holes 71 which are open into the auxiliary chamber 4 closed by the balls 92a or the tappets 93a that are biased in the direction from the auxiliary chamber 4 toward the chamber 3. In as much as the balls 92a or the tappets 93a are biased in the direction from the auxiliary chamber 4 toward the chamber 3 by the fluid pressure transmitted via the second communication holes 72 into the auxiliary chamber 4, the open ends of the first communication holes 71 which are open into the auxiliary chamber 4 remain more firmly closed by the ball valve 92 or the tappet valve 93.

Because the auxiliary chamber 4 and the first compartments 31 do not communicate with each other via the first communication holes 71, no path of the viscous fluid 6 is formed from the second compartment 32 of one of the chambers 3a, 3b via the auxiliary chamber 4 to the first compartment 31 of the other of the chambers 3a, 3b. Therefore, the viscous fluid 6 has to flow under large resistive forces through small radial gaps between the radially outer end surfaces 53c of the caps 53 and the inner circumferential surface 22 of the tubular casing 2, small radial gaps between the radially-inner end surfaces 8a of the second ridges 8 and the outer circumferential surface 56 of the shaft 5, and small thrust gaps between the end faces of the first ridges 51 and the side surface of the partition wall 7. Consequently, the rotary damper 1 generates a large torque.

When the shaft 5 further rotates counterclockwise from the angular position shown in FIGS. 6A and 6B, the side faces of the hanging walls 53a of the caps 53 abut against the side faces 8b of the second ridges 8. Th shaft 5 stops its rotation, and the parts of the rotary damper 1 return to their angular position shown in FIGS. 3A and 3B. As described above, the rotary damper 1 generates a large torque until the cover is fully closed from the open state.

The check valve 9 can quickly be opened and closed as it is under the spring bias. Even immediately after the shaft 3 has rotated from the angular position shown in FIGS. 5A and 5B to the angular position shown in FIGS. 6A and 6B, the viscous fluid 6 is completely prevented from flowing from the chamber 3 into the auxiliary chamber 4 by the check valve 9 covering the first communication holes 71 without a time lag. As a consequence, the rotary damper 1 is capable of generating a high torque immediately after the shaft 5 has rotated, and is free of backlash.

A rotary damper 1 according to a second embodiment of the present invention will be described below with reference to FIG. 13. Parts of the rotary damper according to the second embodiment which differ from the rotary damper according to the first embodiment will mainly be described below.

Figure 13:
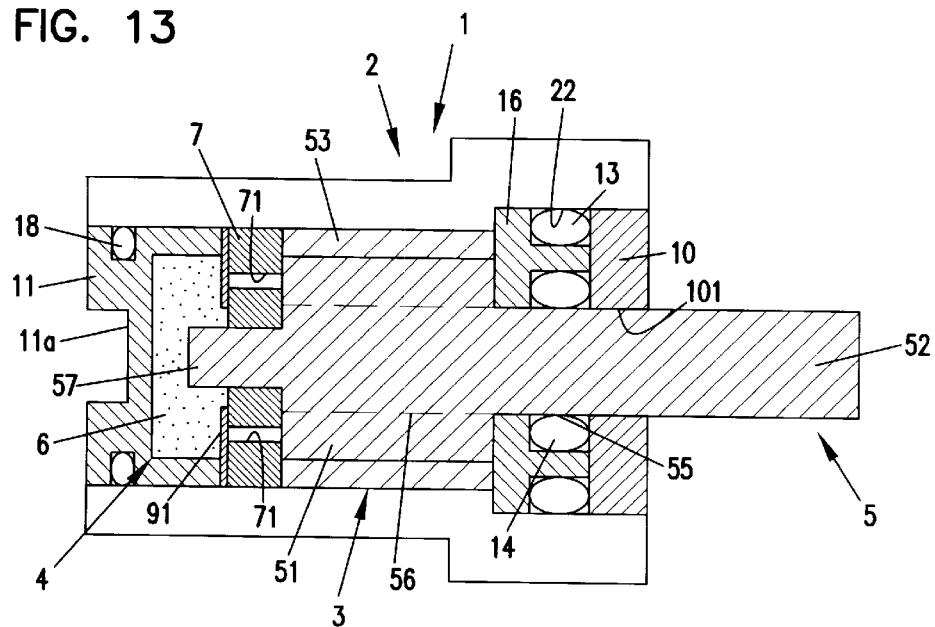
FIG. 13 is a longitudinal cross-sectional view showing an internal structure of a rotary damper according to a second embodiment of the present invention.

As shown in FIG. 13, the rotary damper 1 according to the second embodiment is the same as the rotary damper according to the first embodiment in that the chamber 3 and the auxiliary chamber 4 are defined in the tubular casing 2 in axially juxtaposed relation to each other with the partition wall 7 interposed between the chamber 3 and the auxiliary chamber 4. However, the rotary damper according to the second embodiment is different from the rotary damper according to the first embodiment in that the chamber 3 is positioned closely to the support shaft portion 52 of the shaft 5, i.e., the auxiliary chamber 4 is disposed away from the support shaft portion 52 than the chamber 3.

The shaft 5 is partly accommodated in the chamber 3 which is filled with the viscous fluid 6 such as silicone oil. The tubular casing 2 has an end closed by a bottom wall 11 having a recess 11a defined in an outer surface thereof and an opposite end closed by an apertured cap 10 having a central aperture 101. The support shaft portion 52 of the shaft 5 projects out of the tubular casing 2 through the central aperture 101 in the aperture cap 10.

An O-ring holder 16 is disposed in the tubular casing 2 immediately inwardly of the apertured cap 10 and supported by the shaft 5. First and second sealing members 13, 14 such as O-rings are concentrically mounted on respective radially outer and inner end portions of the O-ring holder 16. Specifically, the first sealing member 13 is disposed radially between the inner circumferential surface 22 of the tubular casing 2 and the O-ring holder 16, and the second sealing member 14 is disposed radially between the outer circumferential surface 55 of the shaft 5. The first and second sealing members 13, 14 are effective to prevent the viscous fluid 6 from leaking out of the tubular casing 2.

Another sealing member 18 is disposed between the inner circumferential surface 22 of the tubular casing 2 and the sealing cap 11 for thereby preventing the viscous fluid 6 from leaking out of the tubular casing 2.

The partition wall 7 which divides the interior space of the tubular casing 2 into the auxiliary chamber 4 adjacent to the sealing cap 11 and the chamber 3 positioned closely to the support shaft portion 52 is fixed to the inner circumferential surface 22 of the tubular casing 2, for example.

As with the first embodiment, the two first ridges 51 are mounted on the outer circumferential surface 56 of the shaft 5 symmetrically with respect to the center O of the shaft 5, and the caps 53 are mounted on the respective first ridges 51. The two second ridges (not shown) extend axially in the chamber 3 and project radially inwardly from the inner circumferential surface 22 of the tubular casing 2 symmetrically with respect to the center O of the shaft 5. The shaft 5 is prevented from rotating when the side faces of one of the hanging walls (not shown) of the caps 53 abut against side faces (not shown) of the second ridges.

The shaft 5 has a smaller-diameter portion 57 on its inner end which projects axially through the partition wall 7 into the auxiliary chamber 4.

As with the first embodiment, the partition wall 7 may be fixed to the inner circumferential surface 22 of the tubular casing 2 by a retaining projection on an axial end of one of the second ridges. Alternatively, the partition wall 7 may be fixed to the inner circumferential surface 22 of the tubular casing 2 by an outer circumferential edge of the partition wall 7 fitted in an engaging groove (not shown) defined in the inner circumferential surface 22 of the tubular casing 2. Alternatively, the partition wall 7 may be integrally formed with the inner circumferential surface 22 of the tubular casing 2. Further alternatively, a first tubular casing with the chamber 3 defined therein and a second tubular casing with the auxiliary chamber 4 defined therein may be prepared, and joined to each other and divided from each other by a common partition wall.

As with the first embodiment, the partition wall 7 has two pairs of first and second communication holes 71 (only the first communication holes 71 are shown in FIG. 13) defined transversely therethrough. The reed valve 91 serving as the check valve 9 for covering the first communication holes 71 is mounted on the surface of the partition wall 7 which is exposed to the auxiliary chamber 4. The reed valve 91 may be replaced with the ball valve 92 shown in FIGS. 11A and 11B or the tappet valve 93 shown in FIGS. 12A and 12B which is biased by the springs supported by the plate 12.

As with the first embodiment, the outer circumferential surface 56 of the portion of the shaft 5 which is disposed in the chamber 3 may have a groove (similar to the groove 54 shown in FIG. 1). The rotary damper 1 may be installed on a device to be dampened, such as a cover, in the same manner as with the first embodiment.

As with the first embodiment, the auxiliary chamber 4, the pair of fluid communication holes, i.e., the first and second communication holes 71, 72, and the check valve 9 such as the reed valve 91 disposed on the first communication hole 71 jointly make up a torque control means for controlling the flow of the viscous fluid 6 between the first and second compartments 31, 32 upon rotation of the shaft 5. The torque control means according to the second embodiment operates in the same manner as the torque control means according to the first embodiment.

A rotary damper 1 according to a third embodiment of the present invention will be described below with reference to FIGS. 14 and 15. Parts of the rotary damper according to the third embodiment which differ from the rotary damper according to the first embodiment will mainly be described below.

Figure 14:
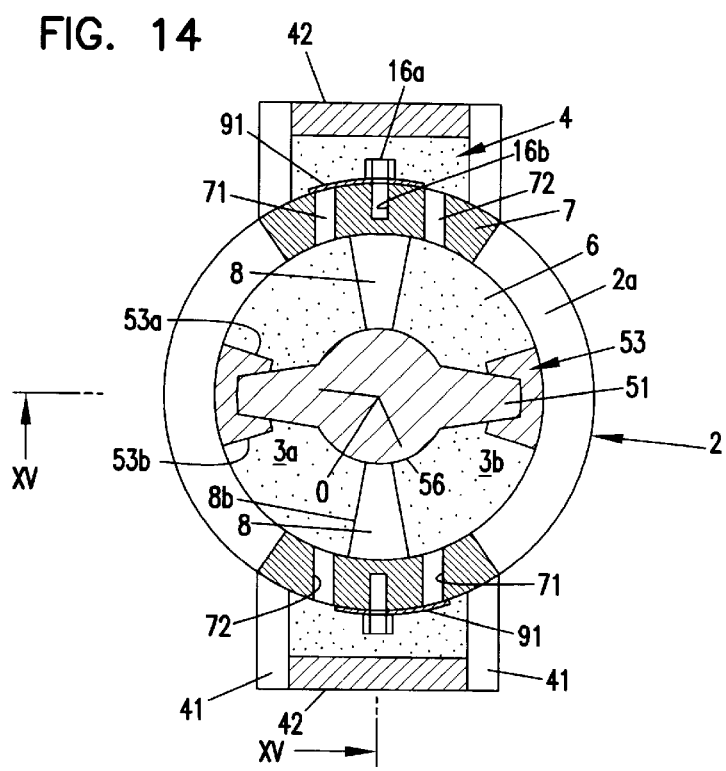
FIG. 14 is a transverse cross-sectional view showing an internal structure of a rotary damper according to a third embodiment of the present invention.
Figure 15:
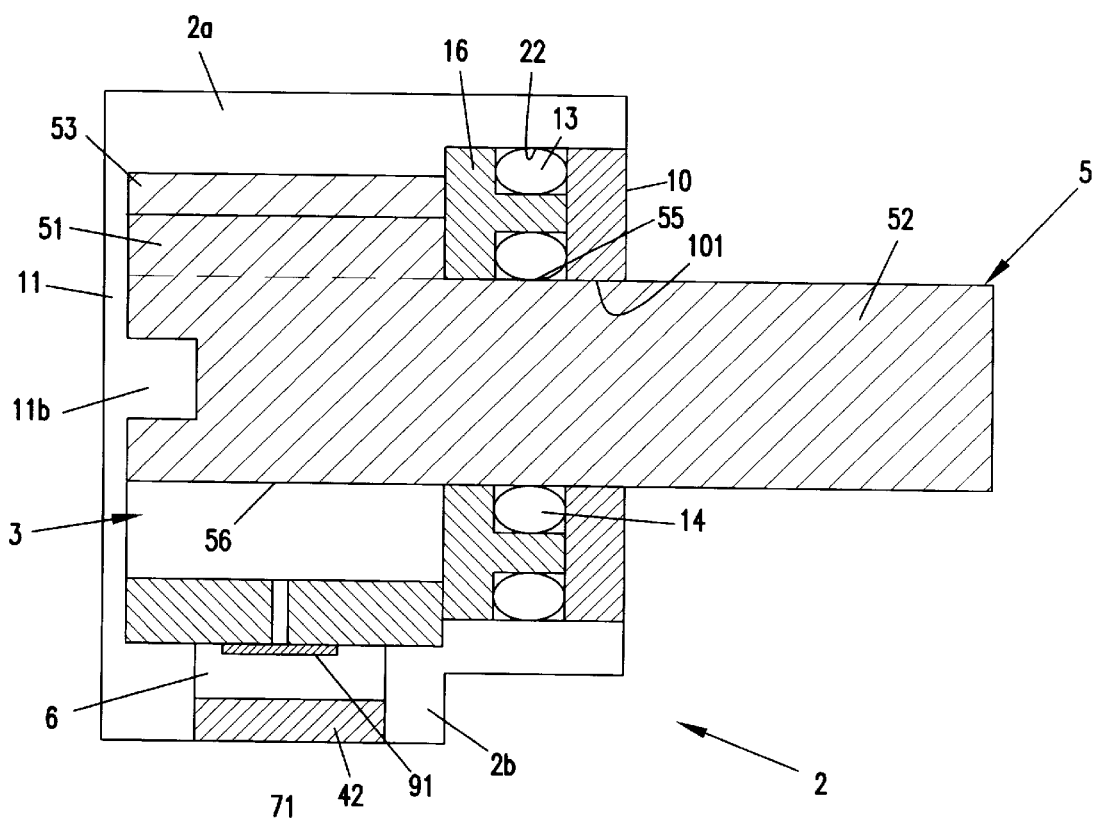
FIG. 15 is a cross-sectional view taken along line XV—XV of FIG. 14.

As shown in FIGS. 14 and 15, the rotary damper 1 according to the third embodiment differs from the rotary dampers 1 according to the first and second embodiments in that the auxiliary chamber 4 is positioned radially outwardly of the chamber 3 with the partition wall 7 interposed therebetween.

In the third embodiment, the shaft 5 is partly accommodated in the chamber 3 which is filled with the viscous fluid 6 such as silicone oil. The tubular casing 2 has an end closed by a bottom wall 11 having a projection 11b projecting inwardly into the chamber 3 and supporting the shaft 5. The tubular casing 2 also has an opposite end closed by an apertured cap 10 having a central aperture 101. The support shaft portion 52 of the shaft 5 projects out of the tubular casing 2 through the central aperture 101 in the aperture cap 10.

An O-ring holder 16 is disposed in the tubular casing 2 immediately inwardly of the apertured cap 10 and supported by the shaft 5. First and second sealing members 13, 14 such as O-rings are concentrically mounted on respective radially outer and inner end portions of the O-ring holder 16. Specifically, the first sealing member 13 is disposed radially between the inner circumferential surface 22 of the tubular casing 2 and the O-ring holder 16, and the second sealing member 14 is disposed radially between the outer circumferential surface 55 of the shaft 5. The first and second sealing members 13, 14 are effective to prevent the viscous fluid 6 from leaking out of the tubular casing 2.

The tubular casing 2 has a circumferential wall 2a including diametrically opposite arcuate regions serving as respective partition walls 7 which are positioned symmetrically with respect to the center O of the shaft 5. The second ridges 8 are mounted on the respective partition walls 7 symmetrically with respect to the center O of the shaft 5. The rotary damper 1 according to the third embodiment has two diametrically opposite auxiliary chambers 4 mounted on respective radially outer surfaces of the partition walls 7 and projecting in the radially outward direction of the rotary damper 1.

The partition walls 7 may comprise arcuate members separate from the circumferential wall 2a of the tubular casing 2 and having the second ridges 8 projecting radially inwardly therefrom, and may subsequently be embedded in the circumferential wall 2a. However, the partition walls 7 should preferably be integral part of the circumferential wall 2a of the tubular casing 2.

Each of the auxiliary chambers 4 comprises a cavity defined by a plurality of radially outward walls 41, 2b integral with the circumferential wall 2a of the tubular casing 2, a radially outer sealing cap 42, and the bottom wall 11.

The partition walls 7 have two respective pairs of first and second communication holes 71, 72 defined transversely therethrough. The first communication holes 71 are disposed respectively in the chambers 3a, 3b, and the second communication holes 72 are disposed respectively in the chambers 3a, 3b. The first and second communication holes 71, 72 of each pair are positioned one on each side of one of the second ridges 8 in the circumferential direction. The first communication holes 71 are positioned symmetrically with respect to the center O of the shaft 5, i.e., diametrically opposite to each other across the center O of the shaft 5, and the second communication holes 72 are also positioned symmetrically with respect to the center O of the shaft 5, i.e., diametrically opposite to each other across the center O of the shaft 5.

A reed valve 91 acting as a check valve 9 is placed on and fixed to the surface of each of the partition walls 7 which is exposed to the auxiliary chamber 4, the reed valve 91 covering one of the first communication holes 71. The reed valve 91 is fixed to each of the partition walls 7 by a screw 16 extending through a hole defined in the reed valve 91 and threaded into a threaded hole 16b defined in the partition wall 7 and opening into the auxiliary chamber 4. However, the reed valve 91 may be locally bonded to each of the partition walls 7 for smoothly opening and closing the first communication hole 71 without fail.

The reed valve 91 may be replaced with the ball valve 92 shown in FIGS. 11A and 11B or the tappet valve 93 shown in FIGS. 12A and 12B which is biased by the springs supported by the plate 12.

As with the first and second embodiments, the two first ridges 51 are mounted on the outer circumferential surface 56 of the shaft 5 symmetrically with respect to the center O of the shaft 5, and the caps 53 are mounted on the respective first ridges 51. The two second ridges 8 extend axially in the chamber 3 and project radially inwardly from the inner circumferential surface 22 of the tubular casing 2 symmetrically with respect to the center O of the shaft 5. The shaft 5 is prevented from rotating when the side faces of the hanging walls 53a or 53b of the caps 53 abut against side faces 8b of the second ridges 8.

As with the first and second embodiments, the outer circumferential surface 56 of the portion of the shaft 5 which is disposed in the chamber 3 may have a groove (similar to the groove 54 shown in FIG. 1). The rotary damper 1 may be installed on a device to be dampened, such as a cover, in the same manner as with the first and second embodiments.

As with the first embodiment, the auxiliary chamber 4, the pair of fluid communication holes, i.e., the first and second communication holes 71, 72, and the check valve 9 such as the reed valve 91 disposed on the first communication hole 71 jointly make up a torque control means for controlling the flow of the viscous fluid 6 between the first and second compartments 31, 32 upon rotation of the shaft 5. The torque control means according to the third embodiment operates in the same manner as the torque control means according to the first embodiment.

Figure 16B:
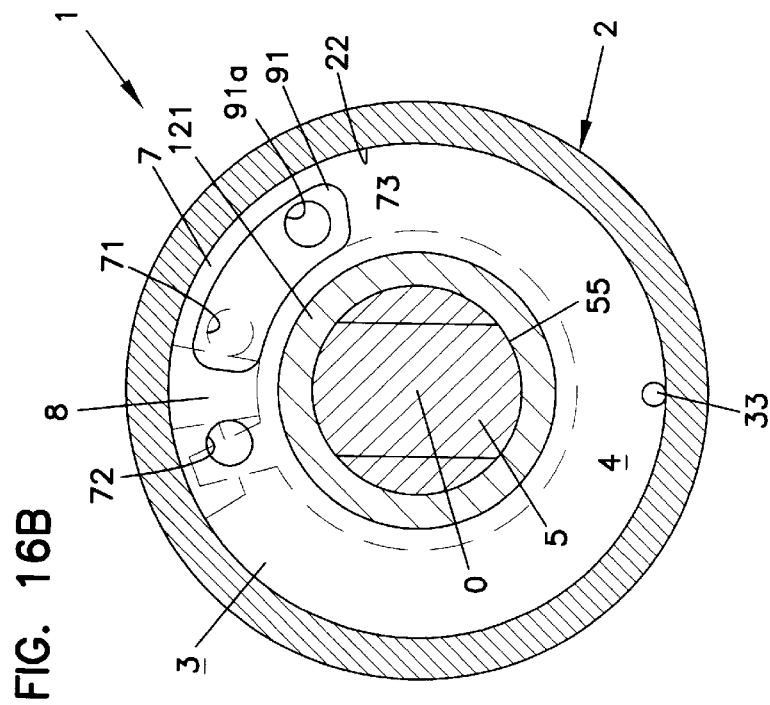
FIGS. 16A and 16B are transverse cross-sectional views illustrative of operation of a rotary damper according to a fourth embodiment of the present invention.
Figure 16A:
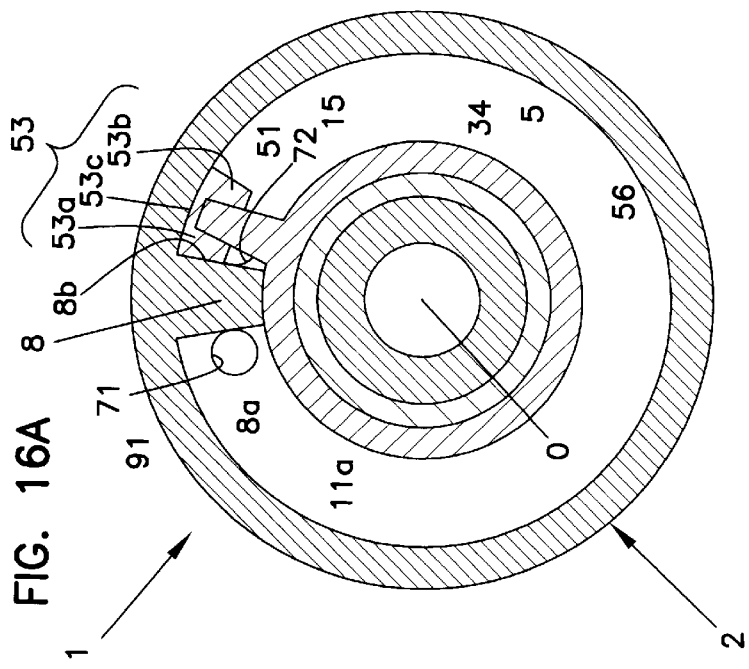

According to the first through third embodiments, the tubular casing 2 has the two second ridges 8 dividing the interior space thereof into the two chambers 3a, 3b, and the shaft 5 has the two first ridges 51 each dividing each of the chambers 3a, 3b into the first and second compartments 31, 32. However, according to a fourth embodiment shown in FIGS. 16A and 16B, the tubular casing 2 has a single second ridge 8 to provide a single chamber 3 therein, and the shaft 5 has a single first ridge 51 dividing the chamber 3 into first and second compartments.

Although not shown, the tubular casing 2 may have three or more second ridges to provide three or more chambers 3 therein, and the shaft 5 may have as many first ridges as the number of the second ridges dividing each of the chambers into first and second compartments.

Figure 17:
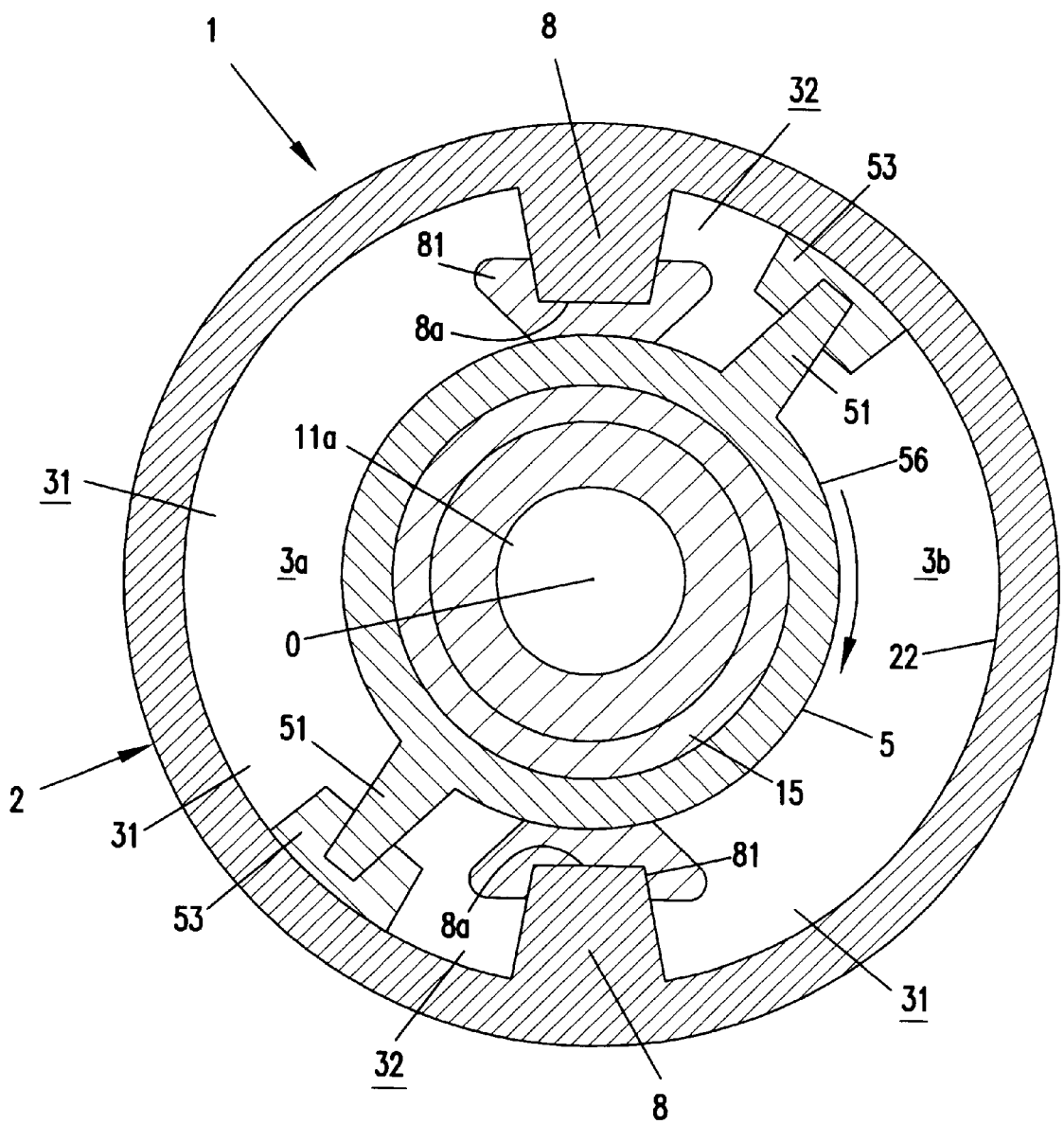
FIG. 17 is a transverse cross-sectional view showing a modification of second ridges of the rotary dampers according to the present invention.
Figure 18:
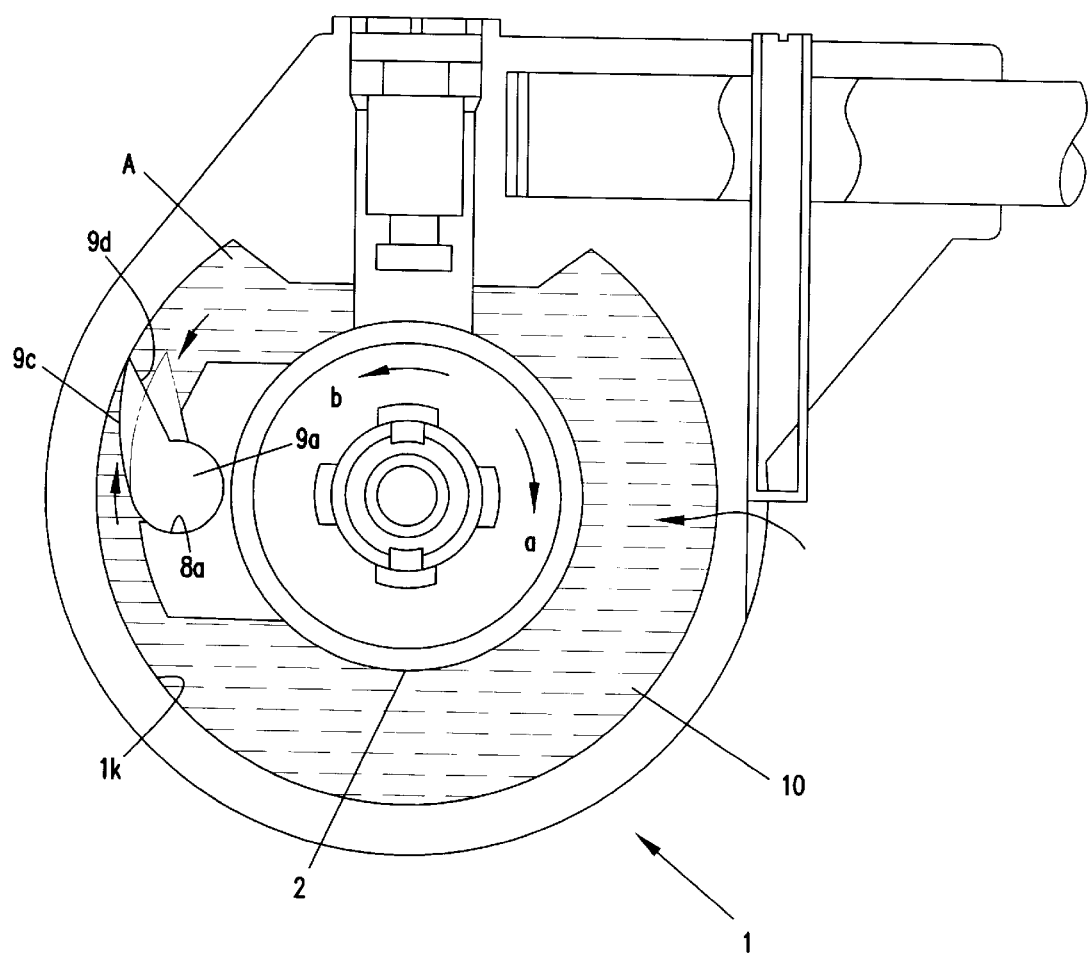
FIG. 18 is a transverse cross-sectional view of a conventional rotary damper.

FIG. 17 shows a modification in which caps 81 are mounted on the respective second ridges 8 to adjust the gaps between the radially inner end surfaces 8a of the second ridges 8 and the outer circumferential surface 56 of the shaft 5.

In the above embodiments, the tubular casing 2 is fixed in position and the shaft 5 is rotated in the tubular casing 2. However, the shaft 5 may be fixed in position and the tubular casing 2 may be rotated around the shaft 5.

Although certain preferred embodiments of the present invention have been shown and described in detail, it should be understood that various changes and modifications may be made therein without departing from the scope of the appended claims.

What is claimed is:

1. A rotary damper comprising:
   a tubular casing having a chamber defined therein;
   a viscous fluid filled in said chamber;
   a shaft having a portion accommodated in said chamber and having a support shaft portion connectable to an external member, said shaft being rotatable with respect to said tubular casing;
   a first ridge extending axially along and projecting radially outwardly from an outer circumferential surface of said portion of the shaft which is accommodated in said chamber, said first ridge having a radially outer end face disposed for sliding contact with an inner circumferential surface of said tubular casing;
   a second ridge extending axially along and projecting radially inwardly from said inner circumferential surface of said tubular casing, said second ridge having a radially inner end face held in sliding contact with said radially outer circumferential surface of said portion of the shaft which is accommodated in said chamber;
   said first ridge and said second ridge cooperating with each other in limiting said shaft and said tubular casing to relative rotation within a predetermined range, and dividing an interior of said chamber into a first compartment and a second compartment, the volume of said first and second compartments being variable complementarily to each other in response to said relative rotation of said shaft and said casing; and
   torque control means for generating a higher torque or a lower torque depending on the direction in which said shaft rotates with respect to said tubular casing, by controlling a flow of said viscous fluid between said first compartment and said second compartment when shaft rotates with respect to said tubular casing;
   said torque control means comprising an auxiliary chamber defined in said tubular casing by a partition wall adjacent to said chamber in communication with said chamber, first and second communication holes defined in said partition wall and providing fluid communication between said first and second compartments and said auxiliary chamber, and a check valve for preventing said viscous fluid from flowing in said first communication hole from said auxiliary chamber toward said first compartment.

2. A rotary damper according to claim 1, wherein said chamber and said auxiliary chamber are juxtaposed axially of said shaft with said partition wall interposed therebetween, said auxiliary chamber being positioned more closely to said support shaft portion than said chamber.

3. A rotary damper according to claim 1, wherein said chamber and said auxiliary chamber are juxtaposed axially of said shaft with said partition wall interposed therebetween, said auxiliary chamber being positioned away from said support shaft portion than said chamber.

4. A rotary damper according to claim 1, wherein said auxiliary chamber is positioned radially outwardly of said chamber.

5. A rotary damper according to claim 1, wherein said check valve comprises a reed valve for covering an open end of said first communication hole which is open into said auxiliary chamber.

6. A rotary damper according to claim 5, wherein said reed valve comprises a proximal portion engaging said partition wall, an arm extending from said proximal portion along the inner circumferential surface of said tubular casing, and a valve body portion on an end of said arm for covering said open end.

7. A rotary damper according to claim 6, wherein said partition wall has an engaging boss formed on a surface thereof which confronts said reed valve, said reed valve further comprising a hole defined in said proximal portion and engaged with said engaging boss, whereby said reed valve is held in engagement with said partition wall.

8. A rotary damper according to claim 5, wherein said inner circumferential surface of said tubular casing has an annular stepped surface, said partition wall having a portion placed on said annular stepped surface.

9. A rotary damper according to claim 5, wherein said reed valve further comprises a central ring portion integrally extending from said proximal portions and defining a through hole through which said shaft extends.

10. A rotary damper according to claim 9, wherein said partition wall has an annular land on a radially inner portion thereof and a circular seat disposed around said open end of said first communication hole on a surface thereof which confronts said auxiliary chamber, said central ring portion of the reed valve resting on said annular land, and said circular seat having substantially the same height as said annular land, said valve body portion being placed on said circular seat to cover said open end.

11. A rotary damper according to claim 10, wherein said circular seat is cylindrical.

12. A rotary damper according to claim 9, wherein said partition wall has an annular land on a radially inner portion thereof on a surface thereof which confronts said auxiliary chamber, said central ring portion of the reed valve resting on said annular land, and said valve body portion having a thickness which is substantially the same as the height of said annular land, said valve body portion covering said open end.

13. A rotary damper according to claim 1, wherein said check valve comprises a ball valve for covering an open end of said first communication hole which is open into said auxiliary chamber.

14. A rotary damper according claim 1, wherein said check valve comprises a tappet valve for covering an open end of said first communication hole which is open into said auxiliary chamber.

15. A rotary damper according to claim 1, wherein said first ridge includes a cap mounted thereon for adjusting a gap between said first ridge and said inner circumferential surface of said tubular casing.

16. A rotary damper according to claim 1, wherein said second ridge includes a cap mounted thereon for adjusting a gap between said second ridge and said outer circumferential surface of said shaft.

17. A rotary damper according to claim 1, wherein said portion of the shaft which is accommodated in said chamber has a groove defined in said radially outer circumferential surface thereof and extending in a circumferential direction thereof.

18. A rotary damper according to claim 17, wherein said groove has a constant depth and a progressively varying axial width.

19. A rotary damper according to claim 17, wherein said groove has a constant axial width and a depth varying in the circumferential direction.

20. A rotary damper according to claim 1, comprising a plurality of second ridges extending axially along said inner circumferential surface of said tubular casing and spaced at equal intervals thereby to define a plurality of chambers in said tubular casing, and a plurality of first ridges extending axially along the radially outer circumferential surface of said portion of the shaft which is accommodated in said chambers, each of said first ridges being positioned in one of said chambers.

* * * * *